Figure 1:
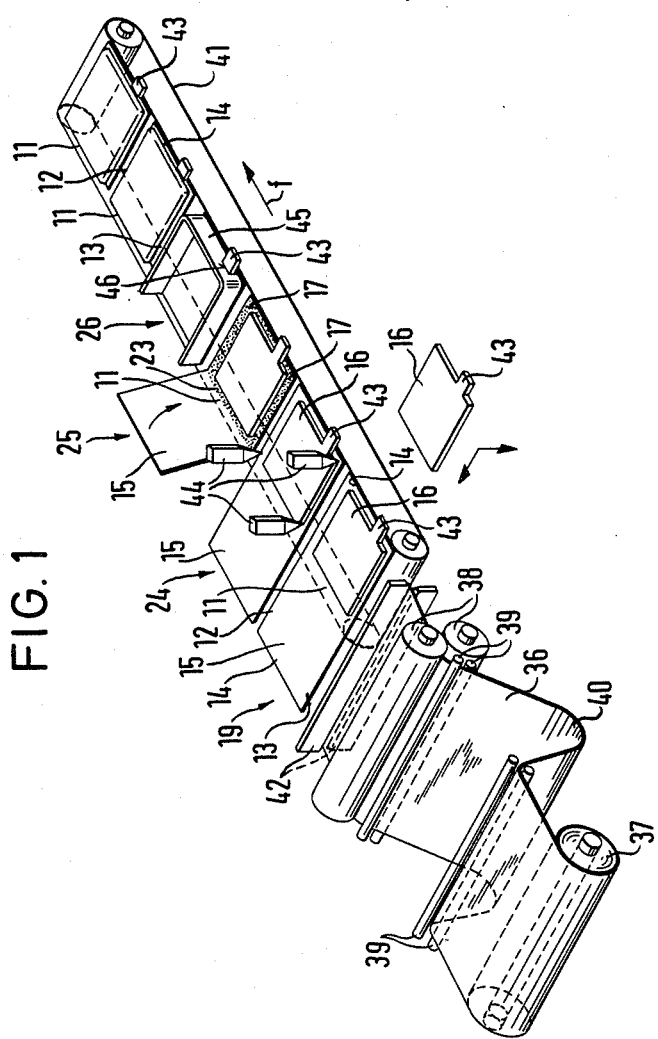

United States Patent [19]

Römling et al.

[11] Patent Number: 4,778,479

[45] Date of Patent: Oct. 18, 1988

[54] METHOD OF MANUFACTURING ACCUMULATORS HAVING ACCUMULATOR PLATE SETS AND AN ACCUMULATOR MANUFACTURED IN ACCORDANCE WITH THIS METHOD

[75] Inventors: Ulrich Römling, Soest-Meckingsen; Eberhard Nann, Soest-Deiringsen; Udo D. Mühlhan; Walter Wipperfürth, both of Taunusstein, all of Fed. Rep. of Germany

[73] Assignee: Hagen Batterie AG, Soest, Fed. Rep. of Germany

[21] Appl. No.: 26,581

[22] Filed: Mar. 17, 1987

[30] Foreign Application Priority Data

Apr. 2, 1986 [DE] Fed. Rep. of Germany ....... 3610952

[51] Int. Cl.⁴ .............................................. H01M 2/18
[52] U.S. Cl. .................................... 29/623.1; 429/139
[58] Field of Search ............... 429/136, 139, 186, 208, 429/66; 29/623.1

[56] References Cited

U.S. PATENT DOCUMENTS

| 4,037,030 | 7/1977 | Sabatino | 429/139 |
| 4,063,978 | 12/1977 | Badger et al. | 29/623.1 |
| 4,080,727 | 3/1978 | Stolle et al. | 29/623.4 |
| 4,336,314 | 6/1982 | Yonezu et al. | 429/66 |
| 4,509,252 | 4/1985 | Sabatino et al. | 29/623.1 |

FOREIGN PATENT DOCUMENTS

| 0751398 | 6/1933 | France | 429/136 |
| 3304257 | 8/1984 | Fed. Rep. of Germany | 29/623.1 |
| 2122411 | 1/1984 | United Kingdom . | |

OTHER PUBLICATIONS

Japan Patent Abstract 57-138784(A) to Yuasa et al., Pub. 11/1982, vol. 6/No. 23*.

Primary Examiner—Donald L. Walton
Attorney, Agent, or Firm—Townsend & Townsend

[57] ABSTRACT

In a method of manufacturing accumulator plate sets separator sheets (15) consisting of glass fleece are cut to size and are adhesively bonded to form pockets after being folded around a positive grid plate laid thereon. A predetermined compressive stress is maintained in the plate set (18) by bands (21) placed around it, whereupon the plate sets are then inserted into an accumulator housing (20).

28 Claims, 4 Drawing Sheets

METHOD OF MANUFACTURING ACCUMULATORS HAVING ACCUMULATOR PLATE SETS AND AN ACCUMULATOR MANUFACTURED IN ACCORDANCE WITH THIS METHOD

The invention relates to a method of manufacturing accumulators having an accumulator housing and arranged therein accumulator plate sets with alternating positive and negative plates separated from one another by a separator material, wherein, for the formation of pockets a separator sheet is in each case folded around at least one type of plate, preferably around the positive plates, and at least the side edges adjoining the folded edge are fixedly connected to one another, whereupon the pocketed plates and the optionally non-pocketed plates are stacked into plate sets and are inserted into an accumulator housing, whereafter the intercell welding and the closure of the accumulator housing take place.

In a method of this kind (German Offenlegungsschrift No. 33 04 257) the pocketing of the positive plate in pockets formed of separator material takes place for the purpose of avoiding short circuits at the base of the plate set on the settling out of the positive slurry. After pasting of the negative and positive plates, and after forming, the positive plates are pocketed in that a web which is dimensioned to be twice as wide as the positive plates runs off from a roll of separator band and is folded by suitable deflection devices in such a way that a pocket open at one side and of any desired length is created into which the plates can be inserted at fixed intervals. The folded separator band with the inserted positive plates then passes through a welding station with the individual pockets being formed by welding the two pocket halves in the region of the side edges of the inserted plates. The individual pockets are subsequently formed by cutting through the folded band in the region of the side edge welds.

In the known method weldable but nevertheless permeable plastic foils must be used for the separator band. The separator band material can thus not be selected solely in accordance with the criteria for a favourable separator material, but must also have the characteristics necessary for the realisation of a solid and dense weld. In general such separator bands are very thin and require special measures at the plate sets in order to ensure a predetermined spacing of the plates laid up into the plate sets. The requirement to continuously form the separator band with a fold extending in its longitudinal direction continuously up to the next throughgoing pocket restricts the number of materials which can be used. The longitudinal folding of the running band namely leads to considerable stressing of the band material, for which purpose a certain minimum strength is required, which is in particular not present with very absorbent band materials which are particularly suitable for separator purposes.

In another known method (German Auslegeschrift No. 12 52 292) positive and negative plates are alternately laid on a band-like separator material whereupon a further band of separator material is laid on this arrangement and welding takes place in the region of the side edges of the plates. The plate set is then produced by folding this arrangement. In this known method the bases of the pockets are open so that true pocketing of the positive plates is not present. In this known method the choice for the separator material is also substantially restricted.

A further known method (U.S. Pat. No. 4,063,978) operates with individual separator sheets of twice the height of the plates to be pocketed with the separator band being folded around the plates from the bottom and with welding subsequently taking place at the edge. This known method also requires a thermoplastic separator material to be used which becomes sticky on heating.

Finally, it is already known (U.S. Pat. No. 4,509,252) to lay two vertically spaced apart frames around the plate sets consisting of positive and negative plates prior to insertion in the cell housing, with the frames engaging around the side and end walls, not however around the upper and lower sides of the plate set.

The object of the invention is now to provide a method of the initially named kind in which material for the separator sheets which is selected solely in accordance with ideal electrochemical characteristics such as electrolyte pick-up and distance keeping can be used and by which a predetermined compressive stress is ensured in the interior of the plate sets in the direction perpendicular to the plate planes.

In order to satisfy this object the invention provides that the separator sheets consisting of a glass fleece (or mat) are cut to somewhat more than the single or double area of the plates to be pocketed and are provided with an acid resistant glass fleece adhesive at least along the side edges and preferably also along the upper edges, and optionally also along the lower edges, whereupon the plates are arranged in each case between two separator sheets and the edges of the separator leaves which project beyond the plates and come into contact with each other are pressed together, and optionally cut through, until the adhesive is hardened; and that the stacked plate sets are set under a predetermined desired plate pressure perpendicular to the plane of the plates, and this desired plate pressure is maintained by a clamping device applied to the plate set at least until the plate set is located in the accumulator housing, with the desired plate pressure then being maintained by firm contact of the end faces of the plate set on fixed parts of the accumulator housing.

Thus, in accordance with the invention, separator sheets or leaves of resiliently compressible glass fleece are used which is expediently a microglass fleece with a mean glass fiber diameter of 0.5 to $5\mu$ and in particular of approximately $0.7\mu$ and a maximum pore size of 0.1. to $40\mu$, in particular of approximately $1\mu$. Furthermore, the glass fleece used should have a thickness of 0.5 to 3 mm and in particular of approximately 2 mm prior to compression of the plate set.

A very absorbent and relatively voluminous glass fleece of this kind can pick up a considerable volume of acid and is simultaneously suited to ensuring, in combination with the compressive pressure applied from the outside, a defined spacing between the individual plates. The use of the glass fleece which is generally not weldable is made possible by the fact that the connection of the side edges and optionally of the upper edge of the folded together separator sheets which complete the pockets is ensured by an adhesive. The choice of the separator material is thus independent of properties favouring a weld. Of particular significance is the maintenance of a predetermined constant compressive bias which is constant from one plate set to another perpendicular to the plate planes, because in this way the degree of elastic compression of the glass fleece separator sheets perpendicular to their planes is accurately adjusted, so that all accumulators manufactured in accordance with this method have the same electrical characteristics. The low tensile strength of a glass fleece in comparison to its compressive strength does not form a restriction having regard to the way the method of the invention is carried out. As a result of the manner and way in which the manufacture of the plate sets is achieved in accordance with the invention it is also possible to compensate without problem for tolerances in the plate thickness which have been caused during manufacture because the same pressure is now always exerted on the plate sets.

The clamping device preferably consists of at least one sulphuric acid resistant band placed around the plate set. Advantageously at least two bands are placed around the plate set and are spaced apart sideways.

In order to simultaneously achieve a shakeproof arrangement for the individual packed together plates provision should further be made for the bands to be placed around the end faces and also the upper and lower sides of the plate set. In this manner displacements of the plates relative to one another are effectively avoided, in particular vertical displacements on the occurrence of shocks. The said arrangement of the bands has the further advantage that they extend over the base of the plate set and there reinforce the folds which are very important for the retention of the positive slurry which separates out.

As the length of the plate sets perpendicular to the planes of the plates can fluctuate through the application of a predetermined compressive pressure to the plate sets, as a result of the customary manufacturing tolerances of the plates and of the separator band material, provision should be made in accordance with a further advantageous embodiment for the plate set to be brought to a constant length determined by the inner space of the accumulator housing, prior to the insertion into the accumulator housing, by the provision of spacer foils or spacer plates.

The spacer foils consist primarily of a smooth and/or porous sulphuric acid resistant plastic such as PVC. However it is also basically possible to use glass fleece plates, as well as plastic plates, as spacer plates to compensate for larger tolerances.

In order to protect against damage, and to reinforce in particular the folds of the individual pockets located at the underside of the plate set, a further embodiment is so constructed that the plate set has two axially outer spacer foils or spacer plates, which are united at the bottom by a base foil or base plate into a U-shaped outer cover foil or cover plate which is folded around externally by the bands. In this case a U-shaped cover foil or cover plate is laid around the entire plate pack. The bands which fix the compressive bias are then placed around this arrangement.

As a result of the adhesive bonding of the side margins of the separator sheets an arrangement of adhesive strips is present at the sides of the plate set in which the adhesive strips project by for example 5 mm beyond the side edges of the plates and this arrangement comes into engagement with the inner wall of the housing on inserting the plate sets into the accumulator housing. This ensures a resilient and yielding lateral support of the plate sets in the housing. As these projecting adhesive strips can be relatively easily deformed by compression and lateral bending a substantial compensation of tolerances is also ensured in the lateral direction of the plate sets.

It is of particular significance that an adhesive is used which penetrates into the glass fleece substantially only perpendicular to the surface to which it is applied, but is not however sucked into the glass fleece parallel to the surface. The adhesive should thus form an intimate bond with the glass fleece material at the position where it is applied, should not however be drawn by capillary forces into the flat surfaces of the separator sheets which are important for the separator effect.

Furthermore, it is expedient for an adhesive to be used which reinforces the adhesively bonded glass fleece but which nevertheless remains flexible and does not remove the porosity of the glass fleece even at the positions at which it acts. In this manner even the projecting adhesive strips of the separator bands still retain sufficient take-up capacity for the sulphuric acid.

In accordance with a first practical embodiment an aqueous dispersion of vinyl ester copolymers is used as the adhesive.

Another possibility lies in using a sulphuric acid resistant fusible adhesive, which is preferably highly thixotropic as the adhesive. A fusible adhesive has the advantage that it can, if required, harden very rapidly and the degree of hardness can be precisely selected and defined. It is possible to effect the pocketing of the plates by using two moving webs of glass fleece, with the first web being guided over the support table and being only fractionally broader than the height of the plates. A second glass fleece web is then guided over this first web and after the application of the adhesive the webs are then laid on one another and adhesively bonded together while enclosing the plates. The step of pressing the webs together can then expediently be combined with the cutting-apart of the individual plate pockets.

It is also possible in this manner to use two glass fleece webs of somewhat more than twice the height of the plates and simultaneously to pocket two plates between the two glass fleece webs which are led above one another. In this way double pockets can be provided by cutting, the two halves of which can then be folded around a negative electrode plate laid therebetween. In this way a very high pocketing speed is achieved.

It is however preferred for the separator sheets consisting of glass fleece to be cut to somewhat more than twice the area of the plates to be pocketed and for them to be provided with a sulphuric acid resistant glass fleece adhesive along the side edges, and preferably also along the upper edges, whereupon the separator sheets are folded around the plates and the edges which come into contact with one another are pressed together until the adhesive has hardened (cured), whereupon the folded edge is also provided with a sulphuric acid resistant stiffening adhesive. In this manner the folded edge is made substantially more resistant by the stiffening adhesive against the cutter-like action of the pocketed plates.

Since the glass fleece used for the separator sheets is not particularly resistant to the cutter-like action of the pocketed plates, it is expedient for the folded edge to also be provided with a sulphuric acid resistant stiffening adhesive.

The adhesive acts here simply as a stiffener and prevents the folded edge, which indeed sits on the base of the accumulator housing, from being mechanically damaged or destroyed, which could lead to short circuits within the plate set.

The regions of the glass fleece bands lying between the positive and negative plates are so protected by the firm pressing between the plates that the low mechanical resistance which is effectively present here is not a disadvantage.

In other words the glass fleece band is stabilised by being pressed between two electrode plates. The regions of the glass fleece bands which project sideways or downwards are however preferably stiffened by an applied adhesive, and thus mechanically strengthened.

From the manufacturing viewpoint it is particularly simple for the stiffening adhesive to be applied with the adhesive which bonds the other edges prior to folding, and for it preferably to be of the same kind as the plastic which bonds the other edges.

It is however also possible for the stiffening adhesive to be applied after formation of the plate sets externally to their lower sides.

Finally, a further embodiment provides that the stiffening adhesive is applied to the lower side of the plate set after the generation of the desired plate pressure and preferably prior to the application of the bands.

In order to take account of the fact that the pockets for the positive plates project further downwardly than the negative plates, a practical embodiment of the method of the invention is so selected that a plate of a fusible stiffening adhesive, which is profiled in correspondence with the arrangement of pocketed positive plates and negative plates disposed therebetween, is applied to the lower side of the plate set and is connected with the folds of the separator sheets by heating.

It is fundamentally also possible for the compressive bias which is initially maintained by the bands to be maintained in the plate sets by the end face walls of the accumulator housing after they have been accurately fitted into the accumulator housing. This is also expedient because the bands only exert pressure on the plate sets along their contact surface while between them bulging of the plates and of the separator sheets is possible under certain circumstances. In so far as the end walls of the accumulator housing maintain the compressive bias the bands can be constructed so that they dissolve in the accumulator acid or at least loose their tension.

The bands preferably consist of an acid resistant polycarbonate foil and retain the tensile stress preset in them even after long operating periods in sulphuric acid. This is of advantage because the parts of the bands which project above the top side of the plate set assist in determining its resistance to shaking.

Figure 2:
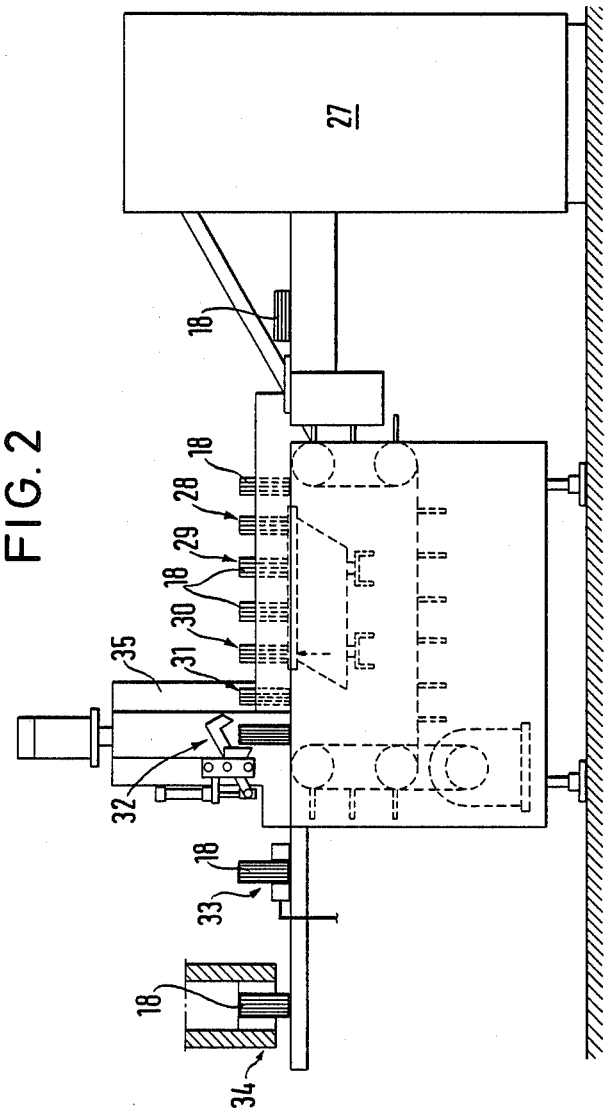
Figure 3:
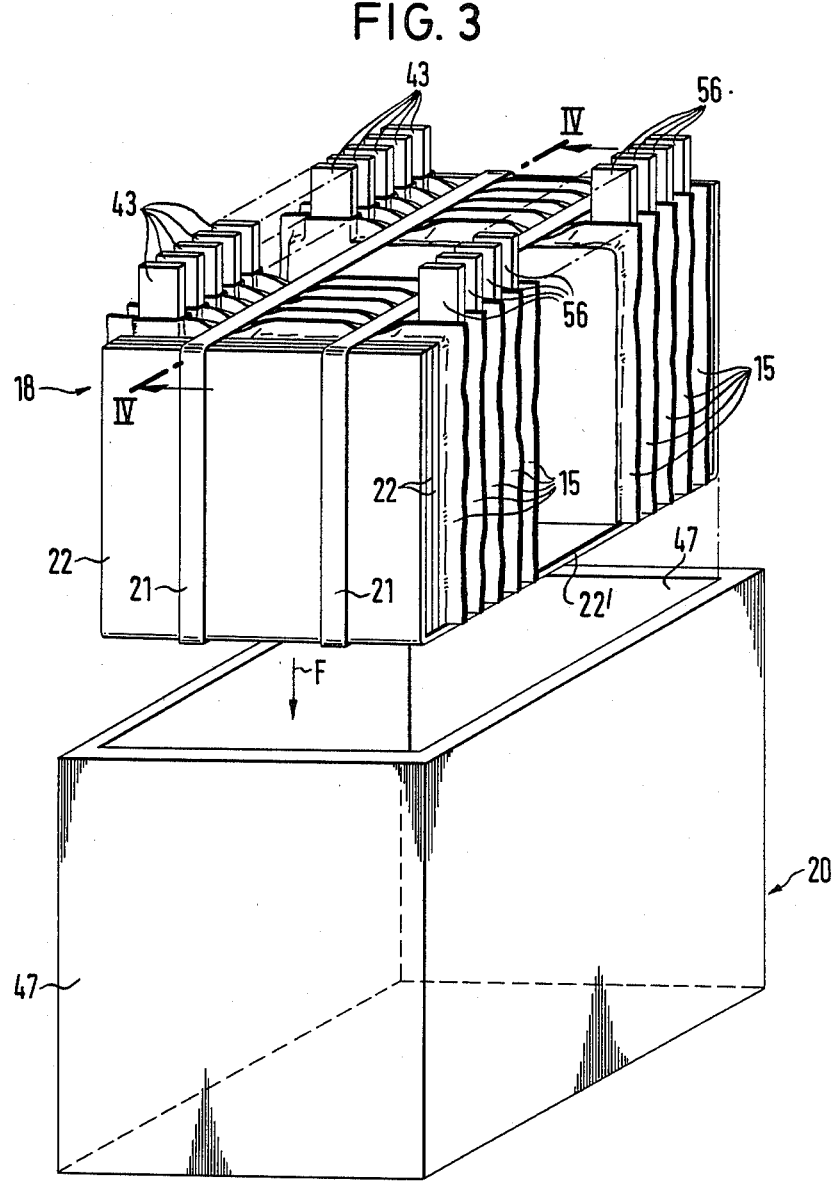
Figure 4:
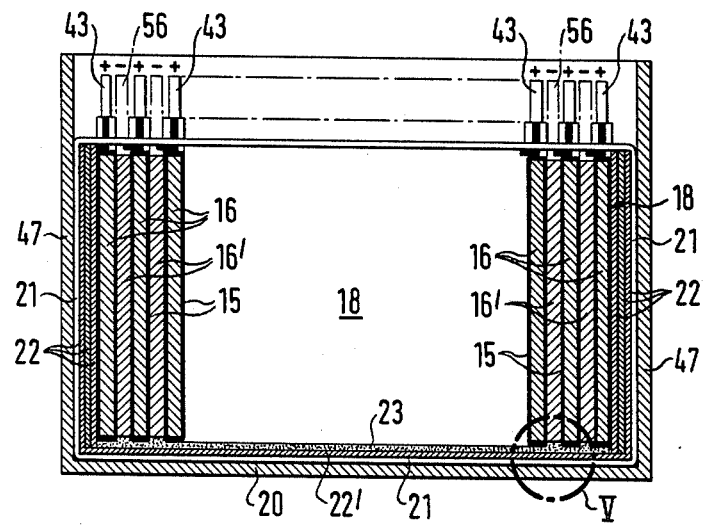
Figure 5:
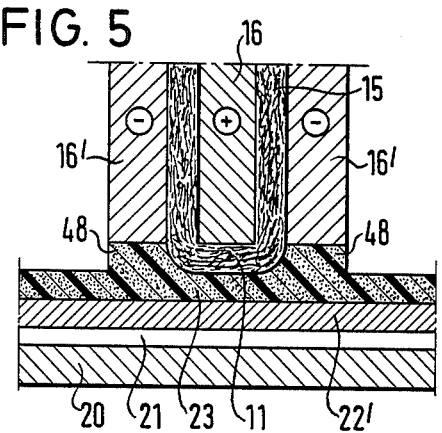

The invention will now be described in the following with reference to the drawings in which are shown:

FIG. 1 a schematic perspective view of an apparatus for carrying out a method of manufacturing pocketed positive plates, FIG. 2 a schematic sideview of an apparatus for the further processing of the pocketed positive plates manufactured in the apparatus of FIG. 1, FIG. 3 a schematic perspective view of an accumulator plate set manufactured in accordance with the method of the invention directly prior to insertion into an accumulator housing which is likewise illustrated, with the thickness of the non-pocketed negative plates being shown somewhat exaggerated for the purpose of simplicity of illustration in order to make apparent in the drawing the spacing between adjacent pockets which is actually hardly present, FIG. 4 a section on the line IV—IV of FIG. 3 with the accumulator plate set inserted into the accumulator housing, and FIG. 5 a schematic view of the portion V of FIG. 4 to an enlarged scale to illustrate a preferred method of stiffening the
pocket folds.

As seen in FIG. 1 a web 36 consisting of a glass fleece (glass mat) is drawn from a supply roll 37 through a take-off roller pair 38 over a run-in table 39 with the rollers 37 and 38 for example being driven. The width of the web 36 is somewhat larger than twice the height of the accumulator plates 16 to be pocketed.

The run-in table 39 is formed by deflection rollers in conjunction with pre-draw roller pairs which guide the glass fleece web 36 to the take-off roller pair 38. The loop 40 which is formed between the deflection rollers and the draw-in roller pairs, and which hangs downwardly, serves the purpose of preventing the glass fleece web 36 from being subjected to tensile load and further to prevent material compression occurring during the subsequent method steps.

Following the take-off roller pair the apparatus of the invention has a conveyor belt 41 which is aligned with the right-hand half of the take-off roller pair 38 and has a width somewhat larger than the height of the plates 16.

Alongside the conveyor belt 41 there is a support plane which extends parallel to it, but which is not shown, on which the regions of the separator sheets 15 lie which do not lie on the conveyor belt 41.

Between the take-off roller pair 38 and the start of the conveyor belt 41 there is a transverse cutting knife 42 through which the supplied glass fleece web 36 is cut into individual separator sheets 15, the dimension of which in the transport direction f is somewhat larger than the width of the plate 16.

Directly at the start of the conveyor belt 41 there is located a plate laying station 19 within which one positive grid plate 16 delivered from the side from a non-illustrated plate magazine and having a connection lug 43 is in each case laid on the half of the separator sheet 15 which is located on the conveyor belt 41, with the connection lug 43 projecting beyond the upper edge 14 remote from the other half of the separator sheet 15.

An electronic length measuring device stops the take-off roller pairs 38 on reaching the previously selected width of the glass fleece pocket. A lead accumulator plate 16 is removed from the plate magazine mounted at the side of the conveyor belt 41 by a non-illustrated pivotal arm with vacuum suckers and is placed centrally on the one half of the separator sheet 15 of glass fleece.

The separator sheet 15 with the plate 16 arranged thereon is then conveyed by the conveyor belt 41 to the subsequent glueing station 24 where an adhesive consisting of an aqueous dispersion of vinyl ester copolymers is applied by means of glue application nozzles to the side edges 12, 13 which project beyond the plate 16 and also to the upper edge 14. In this way thin layers of adhesive 17 and of a stiffening adhesive 23 are applied around the half of each separator sheet 15 carrying the plate 16. The stiffening adhesive 23 can in principle consist of the same material as the adhesive 17 used for the remaining marginal edge regions. However, as the stiffening adhesive 23 is applied in the region of the folded edge 11 formed in the subsequent folding station 25, where actually no adhesion but merely stiffening should be effected, the stiffening adhesive is preferably an adhesive which is primarily suitable for stiffening and stabilising the folded edge 11.

In the folding station the folded edge or folded margin, 11 of the separator sheet 15 is prefolded by means of the plate 16.

After the folding station 25, in which the half of the separator sheet 15 not occupied by the plate 16 is folded upwardly and finally around the plate 16 in the manner shown in FIG. 1 while forming the folded edge 11, the arrangement of the separator sheet 15, which is now already formed as a pocket, and the plate 16 enclosed therein, pass to a pressing station 26. In the pressing station 26 a U-shaped frame 45 which has a cut-out 46 for the connection terminal 43 is pressed from above onto the side edges 12, 13 and also onto the upper edge 14, whereby the edges which come into contact with one another are pressed together with the glue layer between them until the adhesive has set.

At the end of the conveyor belt 41 the finished pocketed positive plates 16 are finally present which are then introduced from the conveyor belt 41 into the plate stacking station 27 which is schematically illustrated in FIG. 2. In the plate stacking station 27 pocketed positive plates 16 and non-pocketed negative plates 16' are alternately laid on one another in order to provide an accumulator plate set 18 which emerges in accordance with FIG. 2 from the plate stacking station 27. The plate set 18 then passes in accordance with FIG. 2 to a testing station 28 where a check is made to see whether the correct number of pocketed and non-pocketed positive and negative plates are present in the correct arrangement.

The plate sets 18 are then passed on further into a pressure generating station 29 where a predetermined compressive stress is applied to the two pocketed positive plates arranged at the end faces of the plate sets 18 so that the entire plate set is subjected throughout to a predetermined axial compressive stress. The plate sets 18 which are subjected to pressure in this way are then conveyed into a thickness measuring station 30 where the thickness of the plate set perpendicular to the plate plane is measured. In a subsequent spacer foil or spacer plate mounting station 31 spacer foils 22 or spacer plates of the required thickness and number are then placed on one or on both end faces of the plate set 18, whereby the plate set is brought to a predetermined length at the preselected pressure.

The plate sets 18 are subsequently conveyed further into a banderoling station 32, where the plate sets, which are now set under a predetermined compressive stress and which have a predetermined thickness, are surrounded (enclosed or wrapped) in accordance with FIG. 3 by sulphuric acid resistant bands 21 which are so tensioned that the compressive stress which has previously been preselected in the plate set 18 is maintained by the bands 21.

As seen in FIG. 3 a plate set 18 of a predetermined length is now present the plates and interleaved glass fleece separator sheets 15 are now subjected throughout to the predetermined compressive stress. In FIG. 3 a substantial spacing can be recognised in the direction of the longitudinal extent of the plate set 18 between the adjacent separator sheets 15, this is however simply simulated by the representation of the negative electrodes with an exaggerated thickness. In reality the electrode plates are so thin and the separator sheets are so voluminous that the adhesively bonded edges of adjacent pockets which project to the side beyond the plates contact one another.

The plate sets are now conveyed in accordance with FIG. 2 into an electrical testing station 33 where a test for adequate electrical insulation of the plates relative to one another is carried out by the application of a high voltage source.

Finally, the checked plate sets 18 pass into an accumulator housing loading station 34 where the plate sets 18 are inserted from above by means of loading cassettes in the manner schematically illustrated in FIG. 3 by an arrow F into an accumulator housing 20 into which they precisely fit, or into a single cell of such an accumulator housing. As the plate set 18 has a predetermined length as a result of the measures of the invention it thus fits so accurately into the interior of the accumulator housing 20 that a defined pressure which assists the action of the clamping bands 21 is exerted on the opposite end surfaces of the set by the endwalls 47 of the accumulator housing 20.

FIG. 4 shows the final assembly of the accumulator housing achieved by the measures of the invention directly prior to the intercell welding which preferably takes place in accordance with the COS process. Finally the accumulator is closed in the customary manner.

As seen in FIG. 3 the accumulator plate set 18 of the invention has the connection lugs 43 of the positive plates 16 at the top at one side and on the opposite side the connection lugs 56 of the non-pocketed negative plates 16'.

A fusible adhesive application station 35 can also be provided between the stations 31 and 32 of FIG. 2 where, in accordance with FIG. 5, a profiled plate consisting of a stiffening fusible adhesive 53 is mounted from below onto the plate set 18, with the cross-section of the profiled plate corresponding to the lower surface of the plate set 18. This fusible adhesive plate 23 is so profiled that strip-like or rib-like projections 48 project upwardly between the folded edges 11 for the positive plates to the lower edges of the negative plates 16'. On heating the fusible adhesive an intimate bond is formed with the glass fleece material and optionally also with the lower margin of the negative plates 16'.

As seen in FIGS. 4 and 5 the outermost ones of the spacer foils 22 provided at the end surfaces of the plate set 18 are connected by a cover foil 22' into a U-shaped overall cover, whereby the lower side of the plate set 18 is additionally protected against mechanical damage.

Negative electrodes of expanded copper metal are particularly well suited for the method of the invention, and for the accumulator manufactured in accordance with this method, because in this way the heat which is created in the interior of the plate sets is led in a particularly favourable manner to the poles. Of particular importance for the present invention are negative electrodes and also positive tube plates such as are described in the simultaneously submitted patent application "negative electrode for lead accumulators", German Application No. P3610952.7, which has been published and corresponds to U.S. Ser. No. 026,610.

We claim:
1. A method of manufacturing an accumulator of the type comprising an accumulator housing having cell compartments and a plurality of accumulator plate sets arranged therein, wherein each said accumulator plate set comprises a plurality of positive and negative rectangular electrode plates arranged in an alternating sequence with separator material disposed therebetween, said rectangular electrode plates each having a pair of oppositely disposed first sides defining the plate length and a pair of oppositely disposed second sides defining the plate width, the method comprising the steps of:

(a) providing a web of microporous glass fleece separator material from a supply roll of the separator material;

(b) cutting a rectangular piece of separator material from said web of separator material, said rectangular piece having a length longer than twice the length of the plate, and a width wider than the width of the plate, said piece defining a first half and a second half about an axis midway between its length;

(c) laying said rectangular piece of separator material on a conveyor;

(d) positioning a positive electrode plate on a first half of said rectangular piece of separator material while said piece is positioned on said conveyor such that regions of the width of the piece project beyond the width of said plate thereby defining a first projecting marginal region, and the second half of said piece projects beyond the length of said plate, thereby defining a second projecting marginal region, said positioning occurring at a station along said conveyor;

(e) applying a glass adhesive to at least one of said projecting marginal regions, said applying occurring at a station along said conveyor;

(f) folding, substantially in half about said axis midway between its length, said second half of said rectangular piece of separator material onto said first half to thereby overlap said plate therebetween, thereby causing confrontation between said first projecting marginal region and confrontation between said second projecting marginal region, said folding occuring at a station along said conveyor;

(g) pressing confrontation marginal regions together at locations provided with said glass adhesive to form a pocketed plate, said pressing occurring at a station along said conveyor;

(h) removing said pocketed plate from said conveyor means and placing it in a stacking station;

(i) positioning a negative plate on said pocketed plate, said position occurring at said stacking station;

(j) repeating steps (a) through (i) with additional plates to assemble an accumulator plate set, said accumulator plate set including a lower side;

(k) transferring said accumulator plate set to a compression station;

(l) applying a predetermined compressive stress to said accumulator plate set, said applying occuring at said compression station;

(m) measuring the dimension of said plate set perpendicular to the plates while said predetermined compressive stress is applied thereto;

(n) banderoling said accumulator plate set with first and second bands being adapted to maintain said predetermined compressive stress at least temporarily; and (o) inserting said plate sets into cell compartments of said accumulator housing.

2. A method in accordance with claim 1, wherein the step of applying a glass adhesive includes applying a glass adhesive to all said projecting marginal regions of the first half of said rectangular piece of separator material.

3. A method in accordance with claim 1, including the additional step of adding spacing foils to at least one face of the accumulator plate set so that the measured dimension of said plate set is equal to a predetermined amount.

4. A method in accordance with claim 3, characterized in that said spacer foils comprise an acid resistance plastic.

5. A method in accordance with claim 4, wherein said plastic is PVC.

6. A method in accordance with claim 3, characterized in that said plate set has two axially outer spacer foils which are united at the bottom by a base foil into a U-shaped external cover foil around which said bands are externally placed.

7. A method in accordance with claim 1, characterized in that the adhesive penetrates substantially perpendicualr, but not parallel, to the glass fleece surface to which it is applied.

8. A method in accordance with claim 1, characterized in that the adhesive stiffens said bonded glass fleece without impairing the porosity of said glass fleece.

9. A method in accordance with claim 1, including the use of an aqueous dispersion of vinyl ester copolymers as the adhesive.

10. A method in accordance with claim 1, including the use of a sulphuric acid resistance, fusible adhesive.

11. A method in accordance with claim 10, characterized in that the regions to which said adhesive is applied include the region adjacent the uppermost width of said plate.

12. A method in accordance with claim 10, wherein said adhesive is highly thixotropic.

13. A method in accordance with claim 11, wherein the step of applying a glass adhesive includes the application of a stiffening adhesive on said second projecting marginal region proximate the axis midway between its length.

14. A method in accordance with claim 13, wherein said stiffening adhesive is the same type as the adhesive bonding said first projecting marginal region.

15. A method in accordance with claim 13, including the additional step of applying, from the outside, a stiffening adhesive to the lower side of said plate set.

16. A method in accordance with claim 15, wherein said additional step is performed after said step of applying a predetermined comprehensive stress and before said step of banderoling.

17. A method in accordance with claim 15, characterized in that said stiffening adhesive is applied to said lower side of said plate set prior to said step of folding.

18. A method in accordance with claim 15, characterized in that said stiffening adhesive is applied to said lower side of said plate set after said step of applying a predetermined compressive stress and before said step of banderoling said accumulator plate set.

19. A method in accordance with claim 15, characterized in that said stiffening adhesive is applied to said lower side of said plate set after said assembly of an accumulator plate set.

20. A method in accordance with claim 1, including the further steps of:

applying a plate, profiled in accordance with the arrangement of pocketed positive plates and negative plates lying therebetween, to said lower side of said plate set;

including a fusible stiffening adhesive on the portion of said profiled plate that contacts the lower side of the pocketed positive plates;

applying heat to said stiffening adhesive to connect the separator material folded over said lower side of said pocketed positive plates to said profiled plate.

21. A method in accordance with claim 1, characterized in that said glass fleece separator material is a microporous glass fleece with a mean glass fiber diameter of $0.5\mu$ to $5\mu$, and a maximum pore size of $0.1\mu$ to $40\mu$, and said fleece has a thickness, prior to said step of applying a predetermined compressive stress of 1 mm to 3 mm.

22. A method in accordance with claim 21, characterized in that said bands include polycarbonate foil.

23. A method in accordance with claim 1, characterized in that said bands include an acid resistant plastic foil.

24. A method in accordance with claim 1, characterized in that said bands are placed around said plate set side up and spaced apart.

25. A method in accordance with claim 1, characterized in that said bands are placed around the end faces of said plate set and around the upper and lower sides of said plate set.

26. A method in accordance with claim 15, wherein the step of applying a glass adhesive includes applying a glass adhesive to all said projecting marginal regions of the first half of said rectangular piece of separator material.

27. A method of manufacturing an accumulator of the type comprising an accumulator housing having cell compartments and a plurality of accumulator plate sets arranged therein, wherein each said accumulator plate set comprises a plurality of positive and negative rectangular electrode plates arranged in an alternating sequence with separator material disposed therebetween, said rectangular electrode plates each having a pair of oppositely disposed first sides defining the plate length and a pair of oppositely disposed second sides defining the plate width, the method comprising the steps of:

(a) providing a web of microporous glass fleece separator material from a supply roll of the separator material;

(b) cutting a rectangular piece of separator material from said web of separator material, said rectangular piece having a length longer than twice the length of the plate, and a width wider than the width of the plate, said piece defining a first half and a second half about an axis midway between its length;

(c) laying said rectangular piece of separator material on a conveyor;

(d) positioning a negative electrode plate on a first half of said rectangular piece of separator material while said piece is positioned on said conveyor such that regions of the width of the piece project beyond the width of said plate thereby defining a frist projecting marginal region, and the second half of said piece projects beyond the length of said plate, thereby defining a second projecting marginal region, said positioning occurring at a station along said conveyor;

(e) applying a glass adhesive to at least one of said projecting marginal regions, said applying occurring at a station along said conveyor;

(f) folding, substantially in half about said axis midway between its length, said second half of said rectangular piece of separator material onto said first half to thereby overlap said plate therebetween, thereby causing confrontation between said first projecting marginal region and confrontation said second projecting marginal region said folding occurring at a station along said conveyor;

(g) pressing confrontation projecting marginal regions together at locations provided with said glass adhesive to form a pocketed plate, said pressing occurring at a station along said conveyor;

(h) removing said pocketed plate from said conveyer means and placing it in a stacking station;

(i) positioning a positive plate on said pocketed plate, said position occurring at said stacking station;

(j) repeating steps (a) through(i) with additional plates to assemble an accumulator plate set, said accumulator plate set including a lower side;

(k) transferring said accumulator plate set to a compression station;

(l) applying a predetermined compressive stress to said accumulator plate set, said applying occurring at said compression station;

(m) measuring the dimension of said plate set perpendicular to the plates while said predetermined compressive stress is applied thereto;

(n) banderoling said accumulator plate set with first and second bands extending around said plate set, said first and second bands being adapted to maintain said predetermined compressive stress at least temporarily; and (o) inserting said plate sets into cell compartments of the accumulator housing.

28. A method of manufacturing an accumulator of the type comprising an accumulator housing having cell compartments and a plurality of accumulator plate sets arranged therein, wherein each said accumulator plate set comprises a plurality of positive and negative rectangular electrode plates arranged in an alternating sequence with separator material disposed therebetween, said rectangular electrode plates each having a pair of oppositely disposed first sides defining the plate length and a pair of oppositely disposed second sides defining the plate width, the method comprising the steps of:

(a) providing a web of microporous glass fleece separator material from a supply roll of the separator material;

(b) cutting a rectangular piece of separator material from said web of separator material, said rectangular piece having a length longer than twice the length of the plate, and a width wider than the width of the plate, said piece defining a first half and a second half about an axis midway between its length;

(c) laying said rectangular piece of separator material on a conveyer;

(d) positioning an electrode plate on a first half of said rectangular piece of separator material while said piece is positioned on said conveyor, such that regions of the width of the piece project beyond the width of said plate thereby defining a first projecting marginal region, and the second half of said piece projects beyond the length of said plate, thereby defining a second projecting marginal region, said positioning occurring at a station along said conveyor;

(e) applying a glass adhesive to at least one of said projecting marginal regions;

(f) folding, substantially in half about said axis midway between its length, said second half of said rectangular piece of separator material onto said first half to thereby overlap said plate therebetween, thereby causing confrontation between said second projecting marginal region, said folding occurring at a station along said conveyor;

(g) pressing confronting projecting marginal regions together at locations provided with said glass adhesive to form a pocketed plate; said pressing occurring at a station along said conveyor;

(h) removing said pocketed plate from said conveyor means and placing it in a stacking station;

(i) performing steps (a) through (h) by positioning a positive electrode plate on the first half of the rectangular piece of separator material while said piece is positioned on said conveyor;

(j) repeating steps (a) through (h) with a negative plate, thereby pocketing the negative plate within said piece of separator material, and positioning said negative plate on said pocketed positive plate, said positioning occurring at said stacking station;

(k) repeating steps (i) and (j) with additional positive and negative plates to assemble an accumulator plate set, said accumulator plate set including a lower side;

(l) transferring said accumulator plate set to a compression station;

(m) applying, at said compression station, a predetermined compressive stress to said accumulator plate set;

(n) measuring the dimension of said accumulator plate set perpendicular to the plates while said predetermined compressive stress is applied thereto;

(o) banderoling said accumulator plate set with first and second bands extending around said plate set, said first and second bands being adapted to maintain said predetermined compressive stress at least temporarily; and (p) inserting said plate sets into cell compartments of the accumulator housing.

* * * * *